United States Patent [19]
Daoud

[11] Patent Number: 6,079,163
[45] Date of Patent: Jun. 27, 2000

[54] REAR MOUNTED RETRACTABLE WEATHER SHIELD

[75] Inventor: Bassel Hage Daoud, Parsippany, N.J.

[73] Assignee: Lucent Technologies Inc., Murray Hill, N.J.

[21] Appl. No.: 09/104,929

[22] Filed: Jun. 25, 1998

[51] Int. Cl.[7] .................................................. E04B 1/34
[52] U.S. Cl. ........................... 52/74; 52/66; 52/68; 52/69
[58] Field of Search .................................. 52/66, 67, 68, 52/69, 74

[56] References Cited

U.S. PATENT DOCUMENTS

| | | | |
|---|---|---|---|
| 1,212,019 | 1/1917 | Coe | 52/66 |
| 1,710,118 | 4/1929 | Smidley | 52/66 |
| 1,796,564 | 3/1931 | Firguson | 160/62 |
| 2,741,195 | 4/1956 | Hartzner | 52/74 X |
| 2,963,290 | 12/1960 | Bauer | 52/74 X |
| 3,067,813 | 12/1962 | Henatsch . | |
| 3,126,944 | 3/1964 | Kempinski | 52/68 X |
| 3,304,670 | 2/1967 | Logan | 52/67 X |
| 3,845,591 | 11/1974 | Stine . | |
| 4,522,246 | 6/1985 | Bierbrauer et al. . | |
| 4,616,451 | 10/1986 | Glick | 52/66 |
| 4,635,699 | 1/1987 | Kauffman et al. . | |
| 4,784,429 | 11/1988 | Hodges . | |
| 4,925,258 | 5/1990 | Ludwig et al. . | |
| 5,156,195 | 10/1992 | Wehler et al. . | |
| 5,215,366 | 6/1993 | Givens . | |
| 5,399,010 | 3/1995 | McClung et al. . | |
| 5,645,333 | 7/1997 | Sakurai . | |

FOREIGN PATENT DOCUMENTS

| | | | |
|---|---|---|---|
| 2558518 | 7/1985 | France | 52/74 |

*Primary Examiner*—Beth A. Stephan
*Assistant Examiner*—Brian E. Glessner
*Attorney, Agent, or Firm*—Stroock & Stroock & Lavan LLP

[57] ABSTRACT

A retractable weather shield for protecting an outdoor structure from the elements, the weather shield having a base panel; a mounting bracket for mounting the structure to a substrate; the base panel being slidably mounted to the mounting bracket; the mounting bracket having a storage space for storing the base panel in a substantially vertical stored position between the substrate and the structure; the mounting bracket having a guide channel for engaging a corresponding guide member on the base panel and guiding said base panel between the stored position and a substantially horizontal deployed position above the structure for protecting the structure from the elements when in the deployed position; and wherein the shield may further have a telescoping panel being slidably mounted and supported within the base panel, the telescoping panel being stored within the base panel when in a stored position and extending substantially outside the base panel when in a deployed position.

30 Claims, 14 Drawing Sheets

REAR MOUNTED RETRACTABLE WEATHER SHIELD

FIELD OF THE INVENTION

This invention relates to a weather shield for use with an outdoor junction box containing electrical components, and in particular, to a rear mounted retractable weather shield for use behind an outdoor building entrance protector.

BACKGROUND OF THE INVENTION

Junction boxes have long been used to collect and protect telephone and electrical wires for distribution, splicing, cross connection and other uses. In the telephony arts, such junction boxes are more commonly known as network interface units (NIUs) and/or building entrance protectors (BEPs).

In a telephone network, a network cable from the central office is connected to a BEP located at the customer site, where the individual telephone lines are broken out line by line. The network cable, which consist of a plurality of tip-ring wire pairs that each represent a telephone line, is typically connected to a connector block that is an integral part of the BEP. Such connectors may be, for example, the ubiquitous 66-type punch down connector, or an SC 99 type connector block, such as are available from Lucent Technologies Inc. The customer telephone equipment is coupled through the connector block to a central office (CO) telephone line. The CO line side of the connector is generally the bottom side of the connector block, where the CO line tip-ring wire pairs are connected using a wire-wrapping tool.

The BEP may, of necessity, be located outdoors. The BEP is generally located at eye level for the convenience of the technicians who service such equipment. The BEP has a lockable outer door to protect the electrical components from the weather and for security and other reasons. Frequently, it is necessary to open the BEP for servicing or maintenance. Such servicing will at times occur during inclement weather, such as rain, snow, or sleet. When the BEP is opened for servicing during such weather, the electrical components are exposed to the inclement weather, which could cause electrical short circuits, pose electrical shock hazards for the technician, or otherwise damage the electrical components. A shield is needed to prevent the inclement weather from contacting the electrical components and also to protect the technician from the elements or from the harmful rays of the sun. A large, fixed rain shield is not a viable option because it would be unsightly and be hazardous to passersby, as most BEP's are located at about eye level. Also, a fixed rain shield would have to be constructed to resist the constant effects of wind, the weight of snow, or accidental collision. Accordingly, a retractable rain shield that can be easily and quickly deployed and stowed is desired.

SUMMARY OF THE INVENTION

The present invention provides a retractable weather shield. The weather shield can be easily and quickly deployed and stowed by a technician servicing the BEP or other utility box when the weather so requires.

The retractable weather shield of the present invention consists of a rigid base panel slidably mounted to a mounting bracket. The base panel may have one or more rigid slide-type telescoping panels slidably mounted within the base panel. The shield can be constructed of metal or plastic or any other suitable material having the necessary rigidity and weather resistant characteristics. The outermost panel is the largest, and each successive panel, if so provided, is progressively smaller. The panels have mutually opposing hooks that allow each panel to engage and interlock with the next larger panel upon deployment of the shield. Upon deployment, the mutually opposing interlocking hooks also prevent water from flowing back towards the BEP. Each telescoping panel has a stabilizing section rearward of the interlocking hook which maintains contact with the next larger panel. The stabilizing sections help provide a more stable structure and can be constructed so as to provide a tilt to the shield upon deployment, so as to lead rain in a given direction.

The shield is stored in a mounting bracket behind the BEP. The mounting bracket has a guide groove in each side wall to accept a corresponding guide bolt or other guide member on the shield in order to guide the weather shield from a storage position to a deployed position. The panels have mechanically mating dimples and detents for frictionaly retaining the panels in either a closed or an open position. For deploying the shield, the technician pulls the shield upward from behind the BEP. The shield is guided upwards by the grooves and corresponding guide bolts until the guide bolts reach the top of the grooves. The technician then directs the shield downward to a substantially horizontal deployed position, whereupon a bottom edge of the base panel contacts either a support surface of the mounting bracket or the top of the BEP. The inner most telescoping panel has a built-in handle to aid in deployment. The technician pulls the handle on the inner most panel, which is the smallest panel, which disengages the dimple/detent retention means. After deploying to its furthest extent, the hook on the panel being pulled engages the opposing hook on the next larger panel, causing that panel to be pulled out. The technician can deploy each successive panel by merely continuing to pull, or the shield can be deployed only partially. Upon full deployment, the panels are held in place by a second dimple/detent retention means. The panels also have a similar engaging feature to facilitate closing, whereupon when the technician wishes to close the shield, the technician pushes the innermost shield back towards the BEP, which disengages the second dimple/detent means, and the innermost shield engages the next larger shield and so on until the shield is fully closed and the first dimple/detent means is engaged. The technician then tilts the shield upward to a substantially vertical position and guides the shield back behind the BEP to its storage position within the mounting bracket. The shield is guided by guide bolts which slide within the corresponding guide channels in the mounting bracket. The base panel may also have a weight or spring-type mechanism for biasing the shield towards the stored position. The biasing force will aid the technician in storing the shield.

The panels may be sloped or somewhat v-shaped, e.g., where the center is higher than the sides, to aid in guiding the water towards the sides of the shield and away from the BEP. Accordingly, upon deployment, the electrical components in the BEP and the technician working thereon, are protected from the elements.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views.

DETAILED DESCRIPTION OF THE PREFERRED EMBODIMENTS

Figure 1:
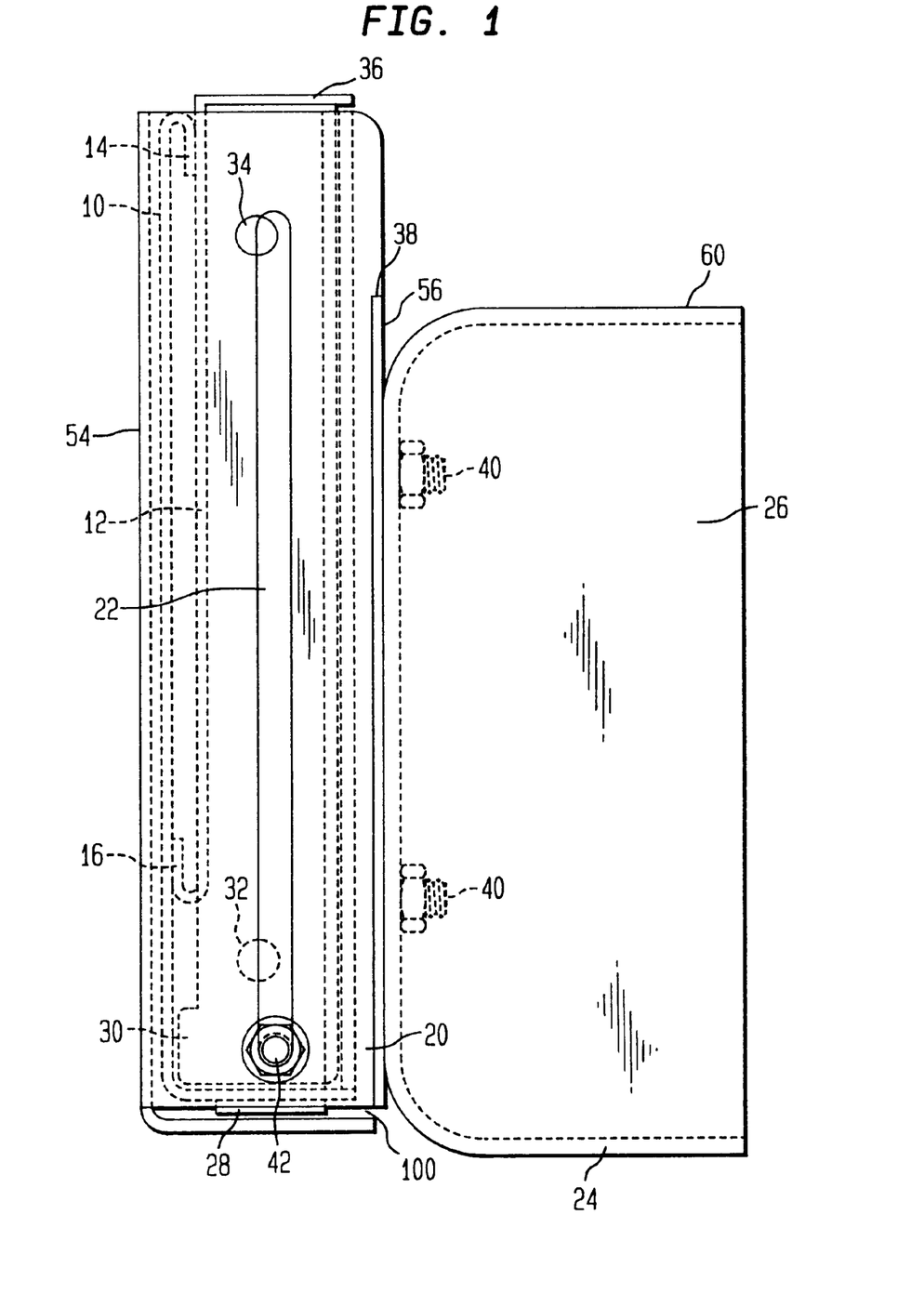
FIG. 1 is a side view of a retractable weather slidably mounted to a mounting bracket in its substantially vertical stored position and constructed in accordance with a preferred embodiment of the present invention, with an attached BEP mounted thereon.
Figure 5:
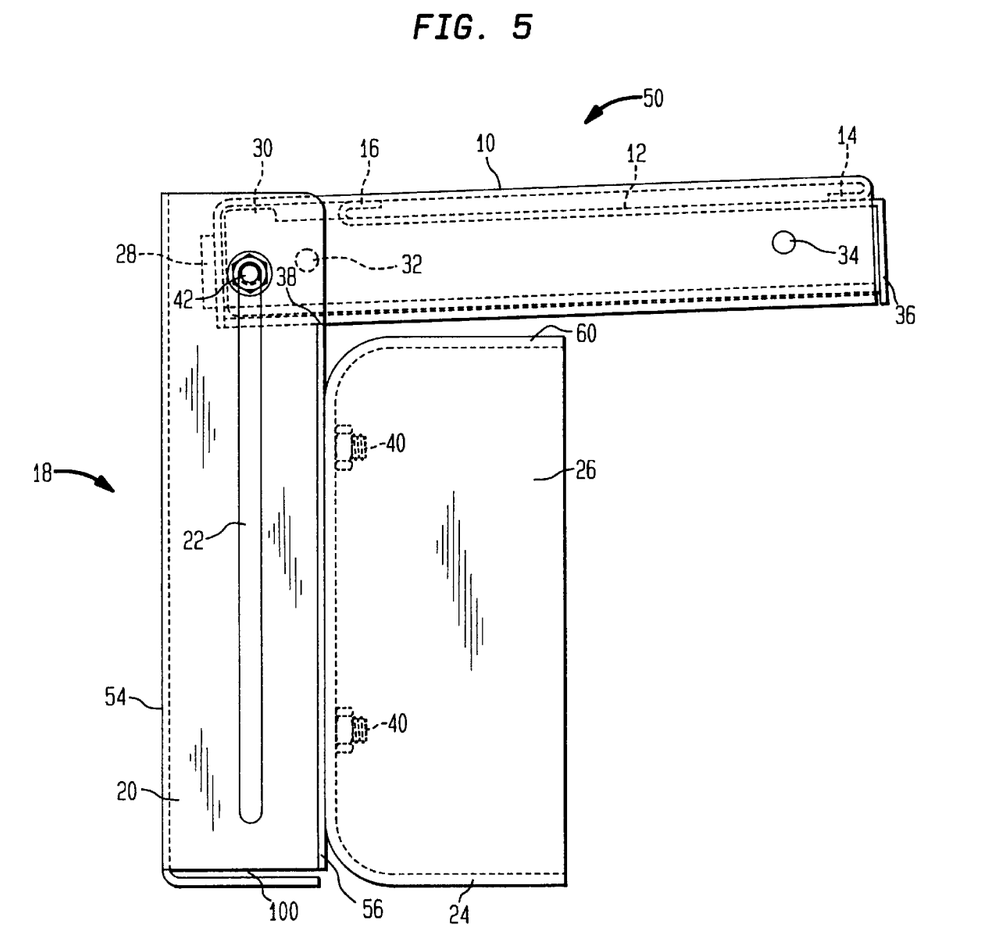
FIG. 5 is a side view of the retractable weather shield slidably mounted to a mounting bracket in its substantially horizontal deployed position.

With initial reference to FIGS. 1 and 5, there is depicted a rear mounted retractable weather shield in a stored position and constructed according to a preferred embodiment of the present invention. The weather shield, generally depicted as 50, includes a base panel 10 slidably mounted to a mounting bracket 18. Rear surface 54 of mounting bracket 18 is mounted to a mounting surface (not shown) in any art-recognized manner, such as, for example, by screwing, nailing, bracket mounting, rails, standards or the like. Front surface 56 of mounting bracket 18 preferably has mounting bolts 40 for mounting a structure, such as, for example, a Building Entrance Protector (BEP) 24, although other art-recognized mounting techniques could be used. Shield 50 may further comprise a telescoping panel 12 which nests substantially within base panel 10, as well as a weight 28 mounted to a rear portion of base panel 10. Shield 50 is constructed of metal or plastic or any other suitable material having the necessary rigidity and weather resistant characteristics to meet the criteria described herein. As seen in FIG. 1, when the shield 50 is in a closed, substantially vertical stored position, shield 50 rests between the mounting surface and the BEP 24.

Figure 7:
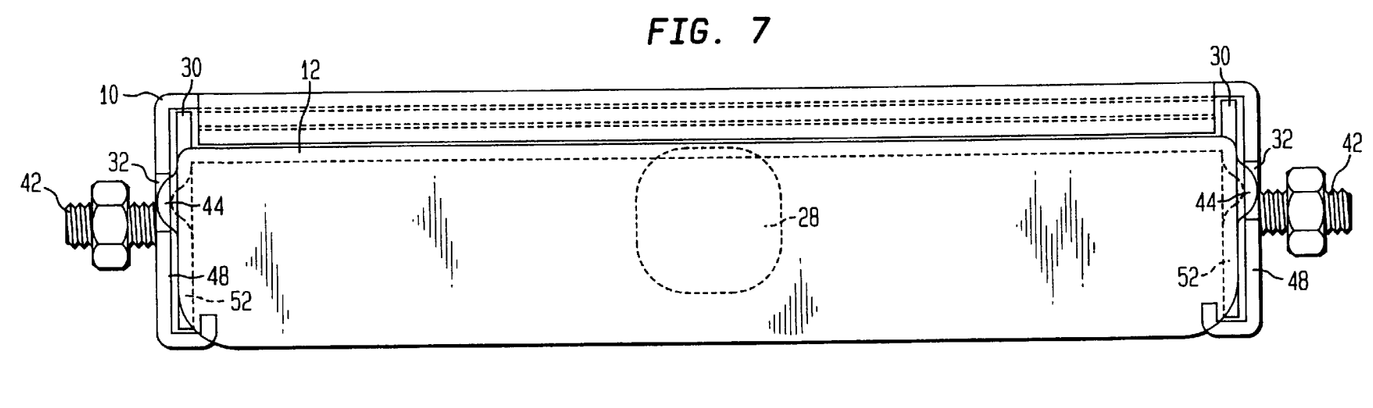
FIG. 7 is a top view of a retractable weather shield constructed in accordance with a preferred embodiment of the present invention.
Figure 8:
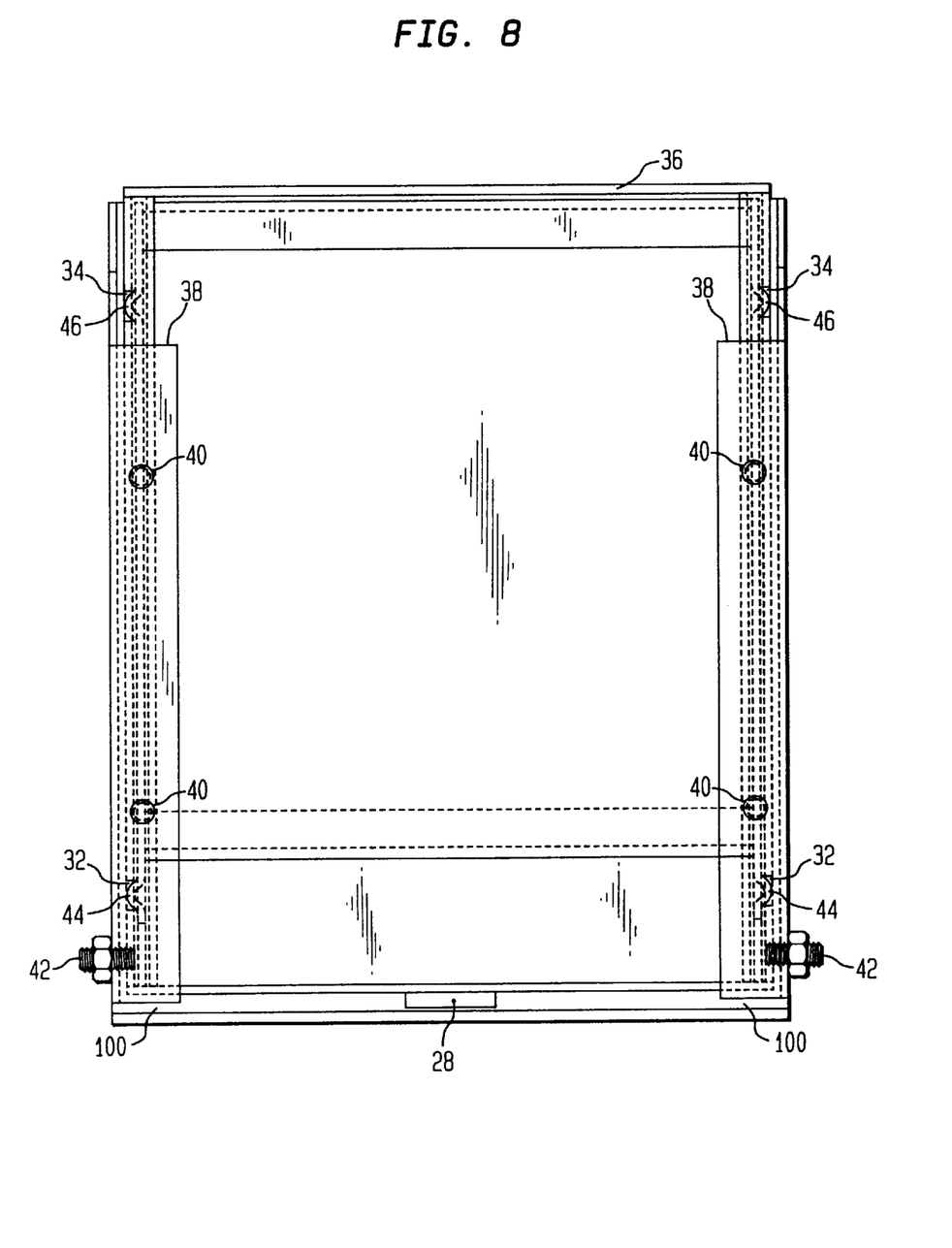
FIG. 8 is front view of a retractable weather shield slidably mounted to a mounting bracket in its closed, stored position and constructed in accordance with a preferred embodiment of the present invention.
Figure 9:
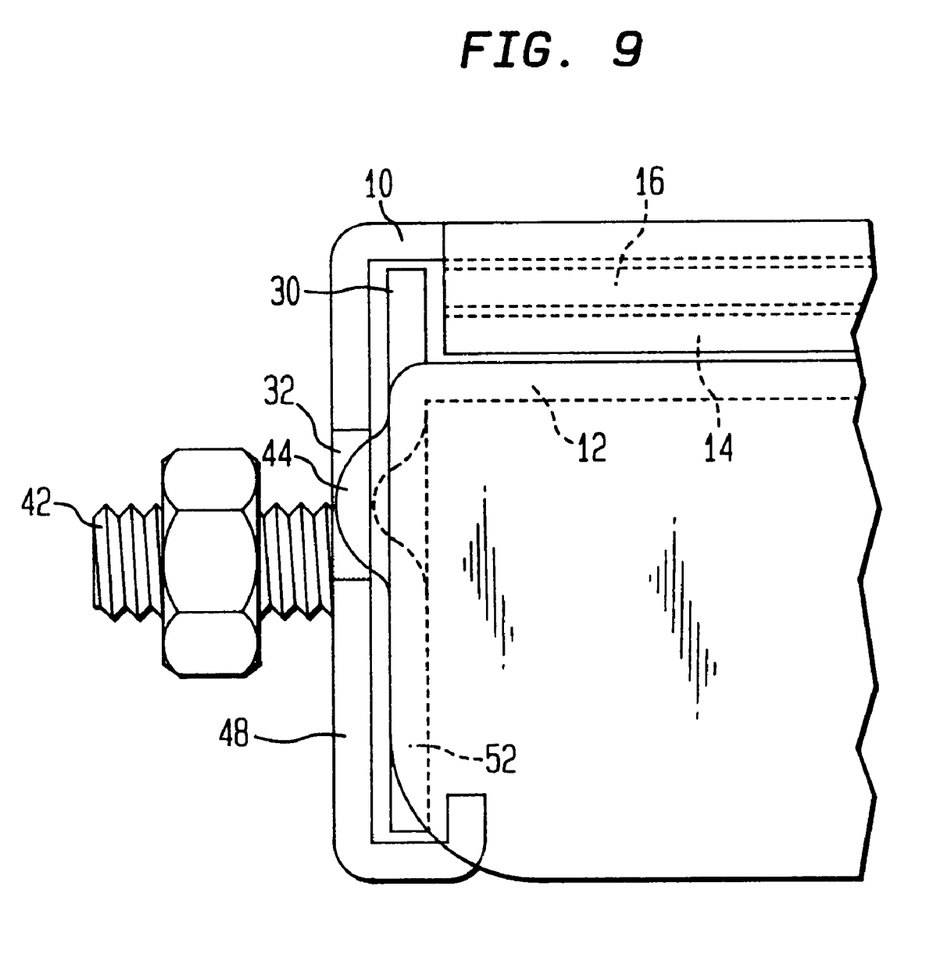
FIG. 9 is an enlarged top partial sectional view detailing the dimple/detent retention means of a retractable weather shield constructed in accordance with a preferred embodiment of the present invention.

In a preferred embodiment, shield 50 also comprises one or more telescoping panels 12. As seen in FIG. 7, telescoping panel 12 is slidably mounted and supported within base panel 10. That is, the lower edge of side walls 48 of base panel 10 are generally U-shaped to create a trough or channel in order to slideably support therein the lower edge of side walls 52 of telescoping panel 12. As seen in FIGS. 7 and 8, the inner surface of base panel 10 side wall 48 preferably has rear dimples 32 and front dimples 34 for frictionaly engaging corresponding rear detents 44 and front detents 46 on an outer surface of telescoping panel 12 side wall 52. That is, when telescoping panel 12 is fully retracted in its closed and stored position within base panel 10, rear detents 44 engage rear dimples 44 and front detents 46 engage front dimples 34, for frictionally maintaining telescoping panel 12 within base panel 10. The engagement of the detents and dimples keeps telescoping panel 12 from sliding out of base panel 10 when the technician begins to guide shield 50 upwards. Once shield 50 is extended fully out of mounting bracket 18 and is lowered into its horizontal deployed position, the technician pulls outward on handle 36 and disengages the detents 44 and 46 from dimples 32 and 34 in order to deploy telescoping panel 12. Base panel 10 is held in place by guide bolts 42, and telescoping panel 12 slides out of base panel 10 to a deployed position, wherein telescoping panel 12 is substantially outside of base panel 10. Once telescoping panel 12 is fully deployed, rear detent 44 engages front dimple 34 (FIG. 8) for frictionally maintaining telescoping panel 12 in its deployed position.

Figure 6:
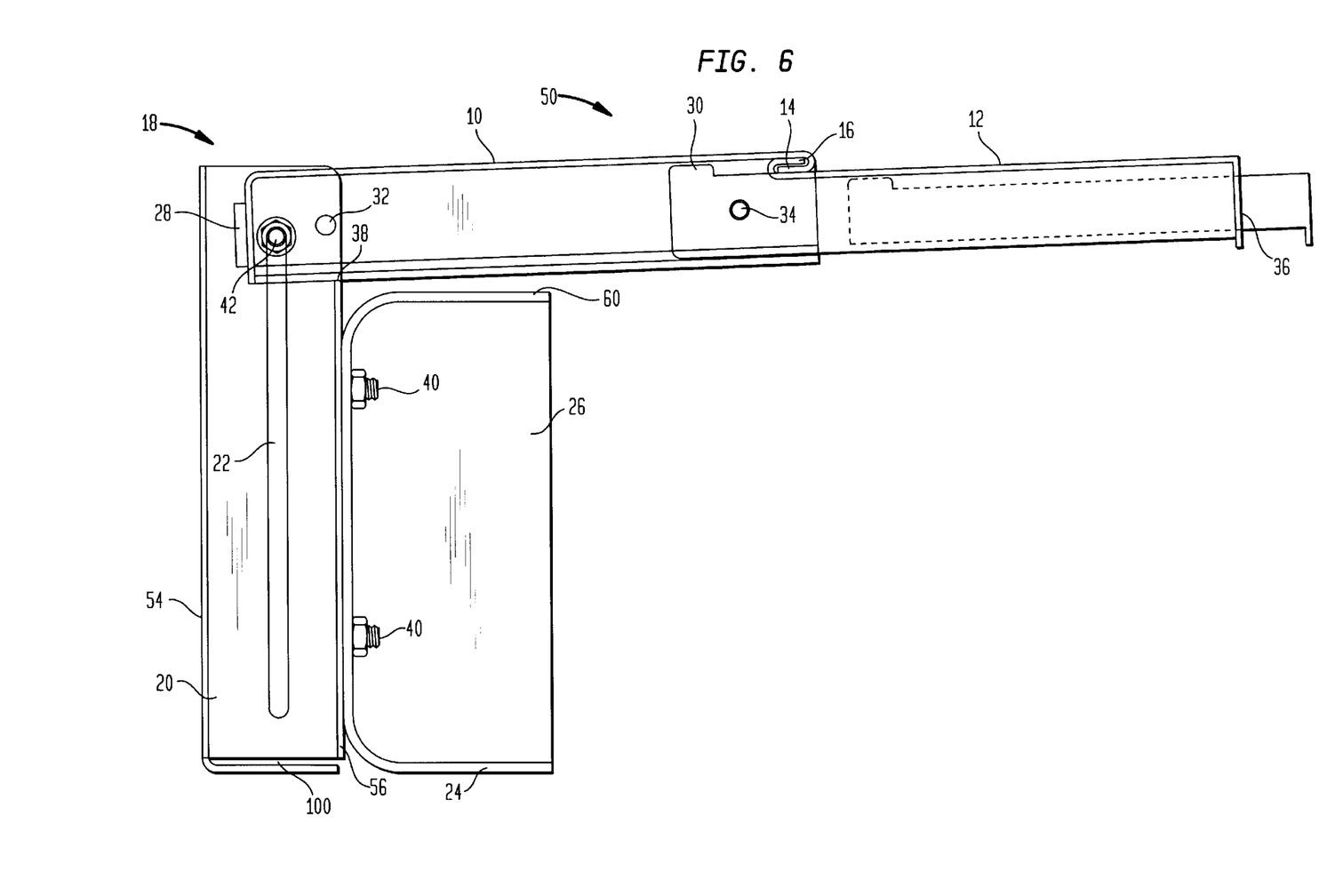
FIG. 6 is a side view of a retractable weather shield slidably mounted to a mounting bracket in its open, fully-extended position and constructed in accordance with a preferred embodiment of the present invention.

As seen in FIG. 5, base panel 10 preferably has an interlocking hook 14, and telescoping panel 12 has a mutually opposed interlocking hook 16. When telescoping panel 12 is fully extended, the mutually opposing hooks 14 and 16 engage one another, providing a water resistant seal. That is, when mutually opposing hooks 14 and 16 engage one another, water is inhibited from flowing backward from telescoping panel 12 to base panel 10 towards BEP 24. Also, as seen in FIG. 6, telescoping panel 12 has a stabilizing portion 30 which maintains sliding contact with the underside inner top surface of base panel 10. The stabilizing portion helps provide a more stable structure during deployment and when the weather shield is fully deployed. Stabilizing portion 30 could be shaved down somewhat to provide a downward tilt to telescoping panel 12, such that telescoping panel 12 is not parallel to base panel 10 once deployed. In any event, when shield 50 is deployed, it extends substantially perpendicular to the mounting surface and the direction of the height dimension of the attached BEP 24, thereby extending over and protecting the BEP. Also, the upper surface of the base panel, and telescoping panel within, may be sloped or somewhat v-shaped, e.g., where the center is higher than the sides, to aid in guiding water towards the sides of the shield and away from the BEP.

In an alternative embodiment, (an example of which is seen in FIG. 6), shield 50 may be constructed with more than one telescoping panel within base panel 10. That is, one skilled in the art will readily recognize that more than one telescoping panel could be provided without departing from the spirit of the invention. Each additional telescoping panel would be constructed in a similar fashion as telescoping panel 12, i.e., with interlocking hooks and stabilizing portions, and dimple/detent retention means. One skilled in the art will recognize that the number of telescoping panels provided, as well as the shape and dimensions of the parts of the shield, is merely a matter of application specific design choice with regard to how large a weather shield is desired. That is, for example, the width of the shield may be larger than the width of the BEP or other structure being protected.

Figure 2A:
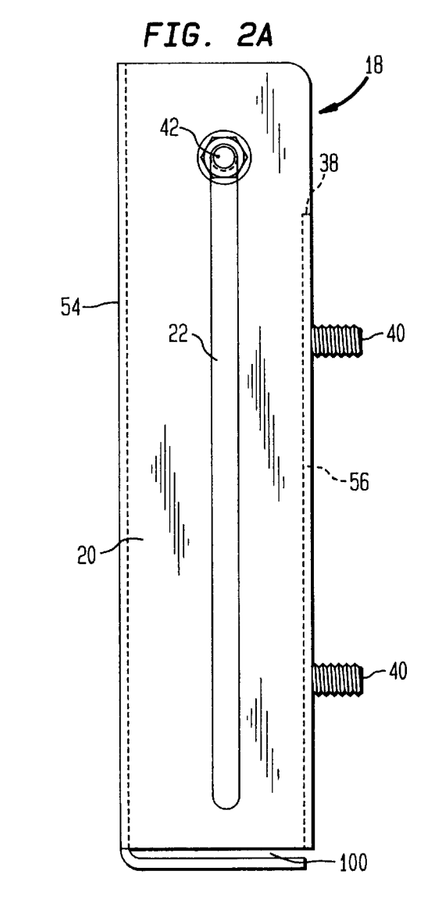
FIG. 2A is a side view of the mounting bracket depicted in FIG. 1.
Figure 2B:
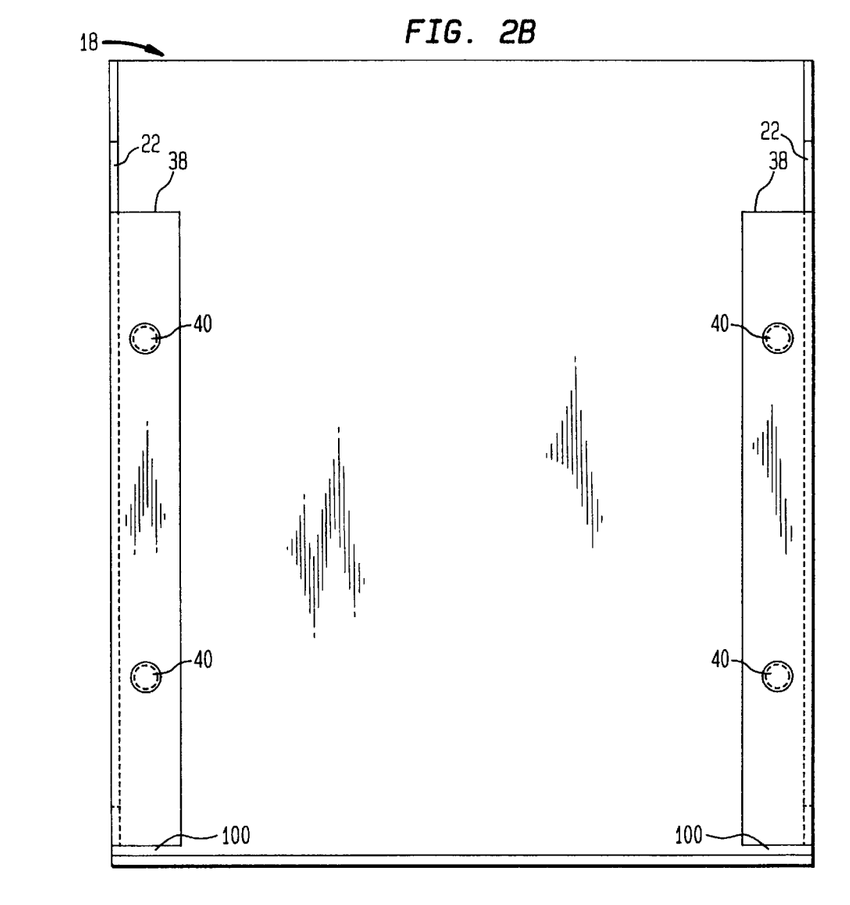
FIG. 2B is a front view of the mounting bracket depicted in FIG. 1.

As best seen in FIGS. 2 and 5, mounting bracket 18 comprises a rear surface 54 which is mountable to a mounting surface or substrate (not shown), guide channels 22, and a front surface 56, preferably equipped with mounting bolts 40 for mounting a BEP 24 or other structure thereon. The space between the rear surface 54 and front surface 56 defines a shield storage space 20. That is, when shield 50 is in its substantially vertical stored position, (FIG. 1), shield 50 rests between the substrate and the BEP within shield storage space 20. Shield 50 is slidably mounted within mounting bracket 18, preferably via guide bolts 42 which slide within guide channel 22, although other guide members may be utilized for sliding within channels 22, such as for example, tabs, rollers, stubs or the like. Moreover, channels 22 may be grooves or troughs or tracks or the like, as opposed to open channels as depicted, so long as guided slideable movement of the shield 50 relative to bracket 18 is maintained during deployment.

As best seen in FIG. 5, the top edge of mounting bracket 18 front surface 56 preferably defines a shield support portion 38. Shield support portion 38 supports an underside edge of base panel 10 when shield 50 is in its deployed position, retaining the shield in a substantially horizontal deployment. However, it should be noted that shield 50 could be supported in any number of ways, for example, by resting on the top of BEP 24, without departing from the spirit of the invention.

Figure 3:
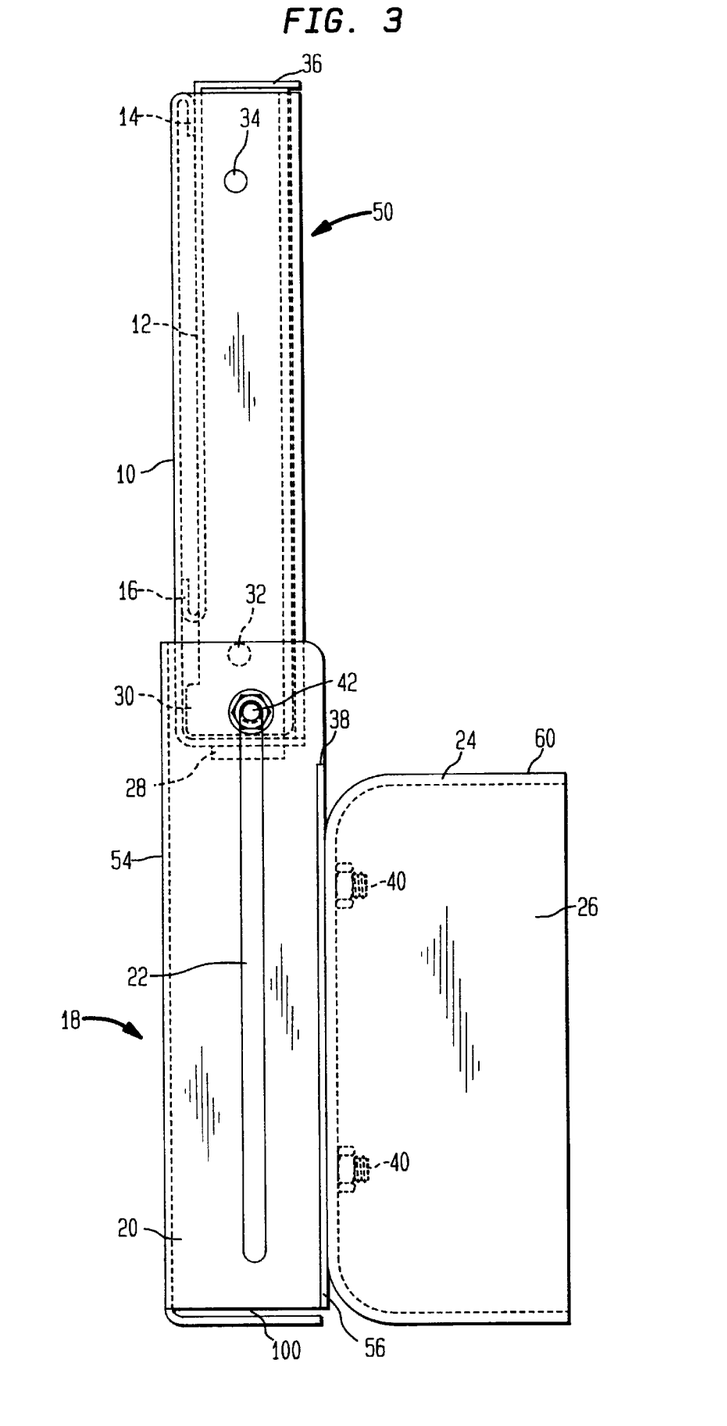
FIG. 3 is a side view of a retractable weather shield slidably mounted to a mounting bracket in a substantially vertical position outside of the mounting bracket.
Figure 4:
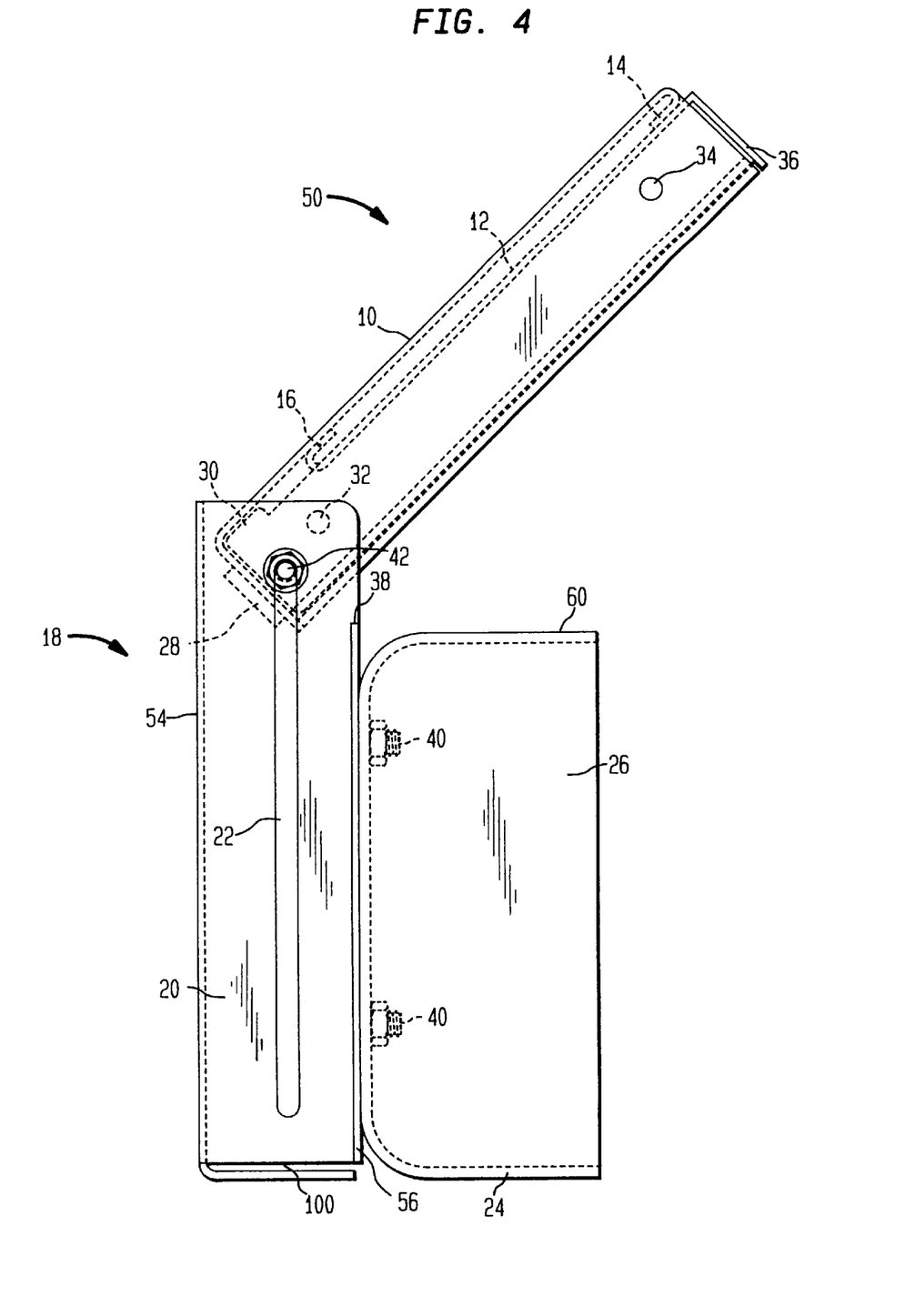
FIG. 4 is a side view of the retractable weather shield slidably mounted to a mounting bracket and shown partially deployed at approximately a 45 degree angle from the mounting bracket.

For deploying shield 50, a technician or other user preferably pulls the shield upward from within shield storage space 20. As best seen in FIG. 3, shield 50 is guided upwards by the sliding interaction of guide bolts 42 within guide channel 22, until guide bolts 42 reach the top of guide channel 22. The technician then directs shield 50 downward (FIG. 4) to a substantially horizontal deployed position (FIG. 5), whereupon a bottom edge of base panel 10 contacts shield support portion 38 of the front surface 56 of mounting bracket 18. As seen in FIG. 5, shield 50 preferably extends substantially perpendicular from the mounting surface or substrate (not shown) when shield 50 is in its deployed position. Also, one of skill in the art will readily recognize that an upward or downward tilt can be imposed on shield 50, such as, for example, by varying the horizontal distance between the top of guide channel 22 and shield support portion 38 or top of BEP 24, or by angling the mounting of bracket 18.

As seen in FIG. 5, the inner most panel, i.e., telescoping panel 12, has a built-in handle to aid in deployment. The technician pulls the handle on telescoping panel 12 which disengages the dimple/detent retention means as described above, and deploys telescoping panel 12, and any other telescoping panels therein, to their fullest extent. Accordingly, when shield 50 is deployed, the BEP interior 26 is protected from the elements, and the technician or other may also be protected from harmful rays from the sun.

To retract shield 50, the technician essentially reverses the steps outlined above. That is, the technician pushes inward on handle 36 of telescoping panel 12. This releases rear detents 44 from front dimples 34. Telescoping panel 12 then slides substantially within base panel 10, until detents 44 and 46 engage dimples 32 and 34. The technician then tilts shield 50 upwards to a substantially vertical position. Shield 50 is then lowered into shield storage space 20 via guide bolts 42 and guide channel 22.

In a preferred embodiment, shield 50 also preferably comprises a biasing means for biasing shield 50 towards its stored position. For example, as shown in FIG. 3, a weight 28 may be installed at the rear end of shield 50. Weight 28 helps bias shield 50 into its stored position within shield storage space 20 once shield 50 is in a vertical position for storage. One skilled in the art will recognize that any type of biasing means would work in a similar fashion, i.e., a spring (FIG. 10), an elastic cord, a magnet, etc., without departing from the spirit of the invention.

Figure 10:
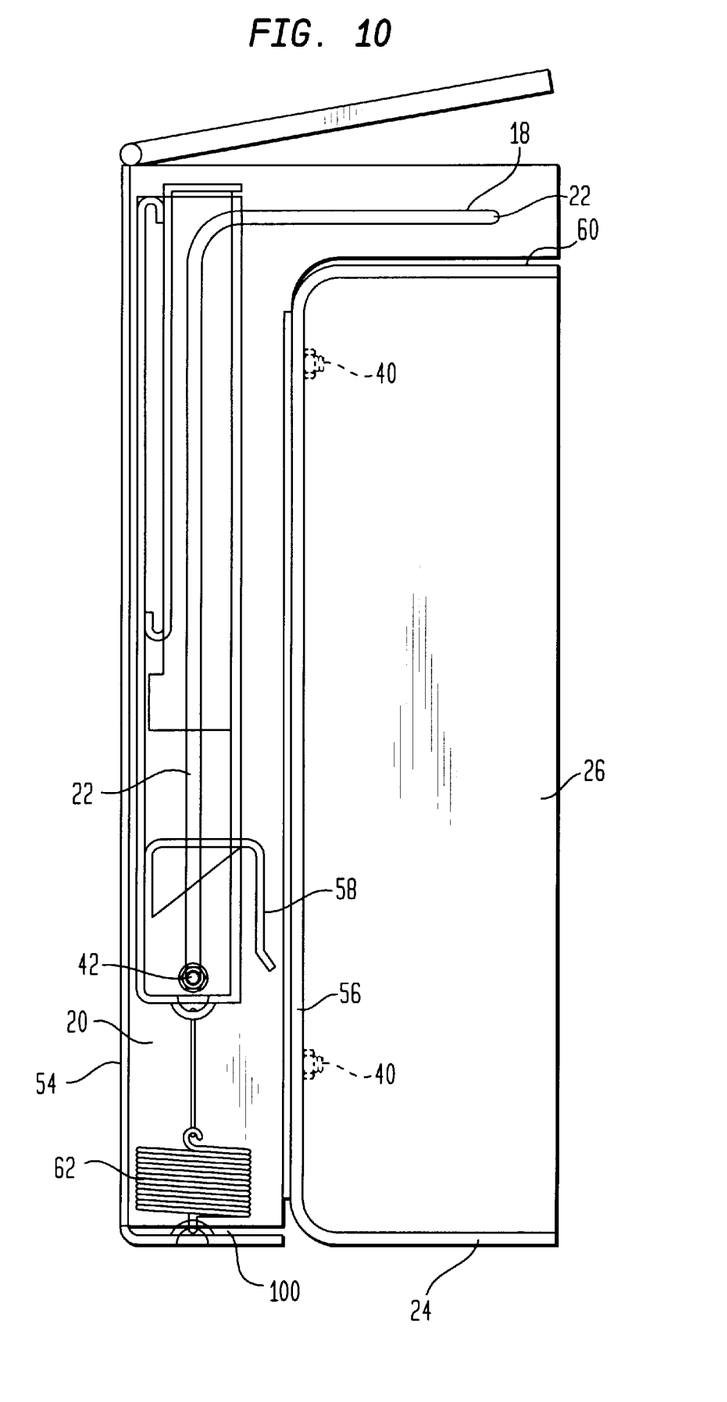
FIG. 10 is a side view of a retractable weather shield slidably mounted to a mounting bracket in its substantially vertical stored position and constructed in accordance with an alternate embodiment of the present invention.
Figure 11:
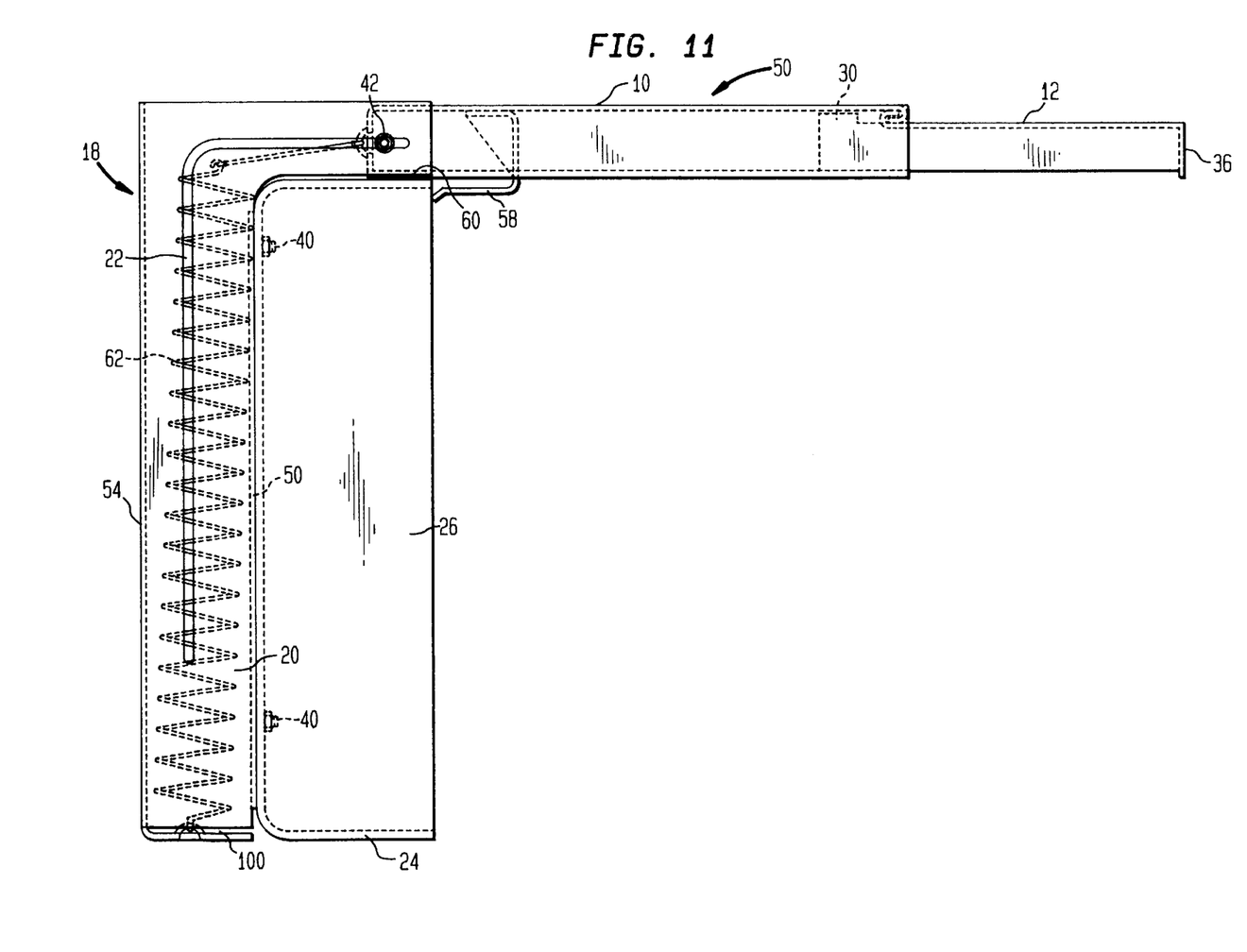
FIG. 11 is a side view of the retractable weather shield of FIG. 10 slideably mounted to a mounting bracket in a substantially horizontal deployed position outside of the mounting bracket prior to engagement of a support hook.
Figure 12:
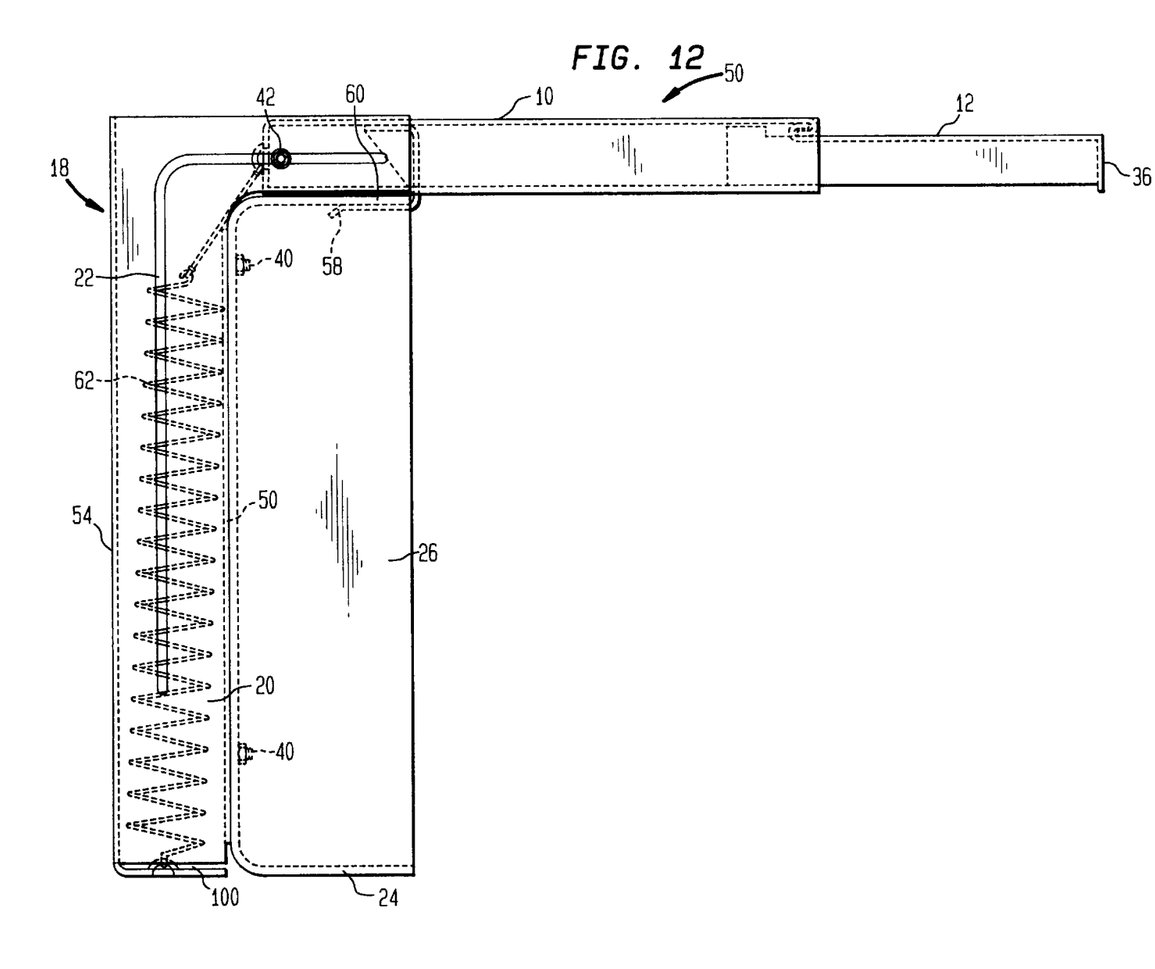
FIG. 12 is a side view of the retractable weather shield of FIG. 10 slideably mounted to a mounting bracket in a substantially horizontal deployed position outside of the mounting bracket with the support hook engaged.
Figure 13:
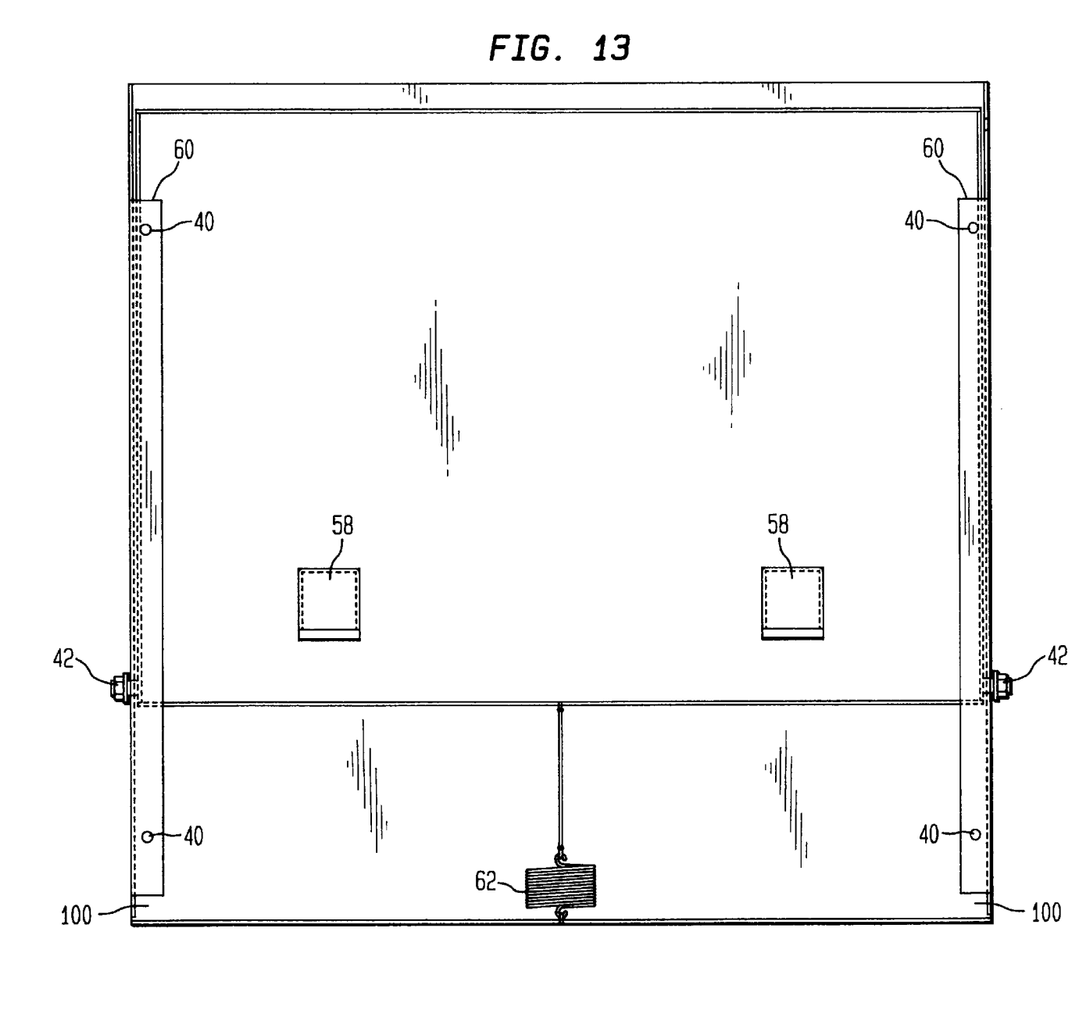
FIG. 13 is a front view of the retractable weather shield of FIG. 10 in its substantially vertical stored position.
Figure 14:
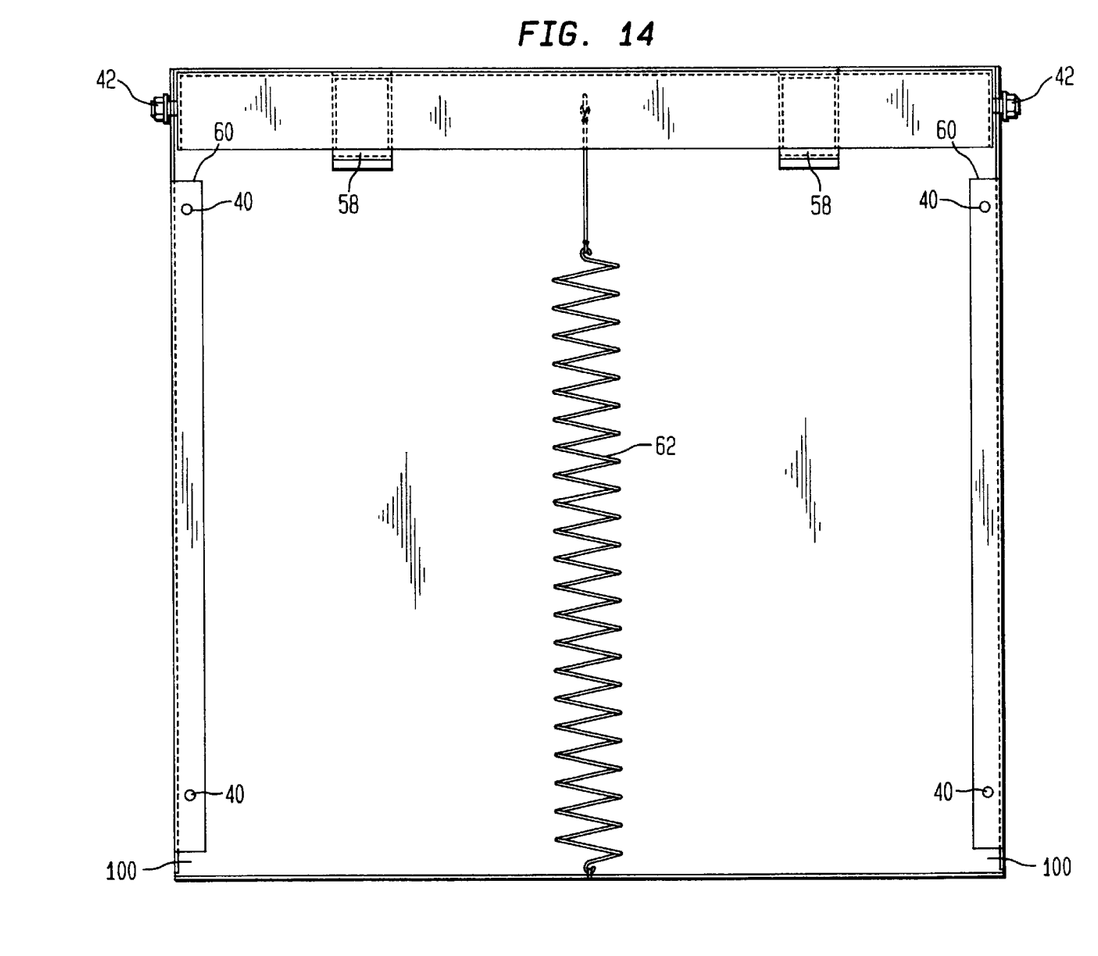
FIG. 14 is a front view of the retractable weather shield of FIG. 10 in its substantially horizontal deployed position.

In an alternate embodiment, as seen in FIGS. 10–14, mounting bracket 18 is generally shaped as an inverted L, and extends over the top edge of BEP 24. As seen in FIG. 10, guide channels 22 are also generally L-shaped, although preferably gently curved at the bend in the "L", extend over the top edge of BEP 24. As seen in FIG. 11, base panel 10 also comprises a support hook 58. Also as seen in FIG. 11, guide channels 22 are constructed off-center, i.e., more towards the substrate, to accommodate support hook 58 when shield 50 is in shield storage space 20. For deploying shield 50, the technician pulls the shield upward from within shield storage space 20 as above. Shield 50 is guided upwards by the interaction of guide channel 22 and corresponding guide bolts 42. As guide bolts 42 reach the top of guide channel 22, shield 50 is tilted downwards and pulled horizontally along guide channels 22 until guide bolts 42 reach the end of guide channel 22. As seen in FIG. 11, when guide bolts 42 are at the end of guide channel 22, support hook 58 clears BEP top edge 60. The technician then directs shield 50 downward whereby support hook 58 is lower than BEP top edge 60. As seen in FIG. 12, the technician then pushes backward on base panel 10, or permits the shield to move back as a result of the pulling force exerted by a preferred bias element, discussed below, whereupon base panel 10 moves back towards the substrate and support hook 58 engages BEP top edge 60. Once engaged, support hook 58 aids in retaining shield 50 in its deployed position, such as, for example, in heavy wind. The technician then deploys any telescoping panels provided within base panel 10. As seen in FIG. 12, and as discussed above, shield 50 extends substantially perpendicular from the substrate (not shown) when shield 50 is in its deployed position. Also, one of skill in the art will readily recognize that a downward tilt can be imposed upon shield 50 by merely varying the horizontal distance between guide channel 22 and BEP top edge 60, or by providing an upwardly extending portion in channel 22. In the alternate embodiment depicted (FIGS. 10–14), the biasing means is provided by a spring mechanism 62 for biasing shield 50 towards its stored position. As seen in FIGS. 13 and 14, spring 62 is attached between a lower point in shield storage space 20 and a back edge of base panel 10. Accordingly, when shield 50 is in its deployed position, spring 62 biases shield 50 back towards shield storage space 20. The biasing will aid the technician in retracting shield 50 back into shield storage space 20. To retract shield 50, the technician essentially reverses the above method. That is, the technician pulls outward on shield 50 to disengage support hook 58. Once support hook 58 clears BEP top edge 60, then the technician slides shield 50 back towards the substrate, which slides telescoping panel 12 into base panel 10. When guide bolts 42 reach the back edge of guide channel 22, the technician then tilts shield 50 upwards into a substantially vertical position. Spring 62 then biases shield 50 towards shield storage space 20 as the technician lowers shield 50 into shield storage space 20.

Preferably, mounting bracket 18 is generally provided with sufficient clearance around shield 50, and with a drainage opening 100, for permitting water drainage when the shield is in the stored position. Also, mounting bracket 18 may comprise an easily removable top cover (an example of which is seen in FIG. 10) for protecting both the inside of bracket 18 and shield 50 from the elements when shield 50 is in its stored position.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A retractable weather shield for protecting an outdoor structure from the elements, comprising:
    a mounting bracket adapted to mount a weather shield to a mounting surface and adapted to mount a structure to said bracket such that said bracket lies sandwiched between said mounting surface and said structure;
    a base panel slideably mounted to said mounting bracket and stored in a storage space in said mounting bracket for storing said base panel in a stored position between said mounting surface and said structure;
    said mounting bracket having a guide channel engaging a corresponding guide member on said base panel; said guide channel adopted for guiding said base panel between said stored position and a deployed position above said structure for protecting said structure from the elements when in said deployed position.

2. The weather shield according to claim 1, further comprising a telescoping panel slideably mounted and supported within said base panel, said telescoping panel nesting within said base panel when in a stored position and extending substantially outside said base panel when in a deployed position for providing further protection of said structure from the elements.

3. The weather shield according to claim 2, wherein said mounting bracket is adapted to mount a Building Entrance Protector to said mounting bracket.

4. The weather shield according to claim 3, wherein said base panel has an upper surface that is not flat.

5. The weather shield according to claim 2, further comprising a second telescoping panel slidably mounted and supported within said first telescoping panel, said second telescoping panel nesting substantially within said first telescoping panel when in a stored position and extending substantially outside said first telescoping panel when in a deployed position.

6. The weather shield according to claim 2, wherein said base panel and said first telescoping panel each have a mutually opposing inter-engageable hook that engage during movement of said telescoping panel into said deployed position.

7. The weather shield according to claim 6, wherein said base panel inter-engageable hook engages said first telescoping panel inter-engageable hook when said first telescoping panel is in said deployed position.

8. The weather shield according to claim 7, wherein said engagement of said hooks inhibits a flow of water from an upper surface of said shield toward said structure.

9. The weather shield according to claim 8, wherein said first telescoping panel has a stabilizing portion which contacts an inner surface of said base panel when in said deployed position.

10. The weather shield according to claim 9, wherein said stabilizing portion is constructed such that said first telescoping panel is angled when in said deployed position so as to inhibit a flow of water from an upper surface of said shield toward said structure.

11. The weather shield according to claim 10, wherein said first telescoping panel has a handle to aid in moving said first telescoping panel from said stored position to said deployed position.

12. The weather shield according to claim 5, wherein said first telescoping panel and said second telescoping panel each have a mutually opposing inter-engageable hook that engage during movement of said second telescoping panel into said deployed position.

13. The weather shield according to claim 12, wherein said first telescoping panel inter-engageable hook engages said second telescoping panel inter-engageable hook when said second telescoping panel is in said deployed position.

14. The weather shield according to claim 13, wherein said engagement of said hooks inhibits a flow of water from an upper surface of said shield toward said structure.

15. The weather shield according to claim 14, wherein said second telescoping panel has a stabilizing portion which contacts an inner surface of said first telescoping panel when said second telescoping panel in said deployed position.

16. The weather shield according to claim 15, wherein said stabilizing portion is constructed such that said second telescoping panel is angled when in said deployed position so as to inhibit a flow of water from an upper surface of said shield toward said structure.

17. The weather shield according to claim 15, wherein said second telescoping panel has a handle to aid in moving said second telescoping panel from said stored position to said deployed position.

18. The weather shield according to claim 1, wherein said base panel is supported by said mounting bracket when in said deployed position.

19. The weather shield according to claim 1, wherein said guide channel comprises a pair of oppositely facing grooves.

20. The weather shield according to claim 19, wherein said guide member comprises a pair of guide bolts attached to said base panel and slidably mounted within said grooves.

21. The weather shield according to claim 19, further comprising a biasing means for biasing said base panel toward said stored position.

22. The weather shield according to claim 2, wherein said mounting bracket is L-shaped and is adapted to extend over a portion of said structure.

23. The weather shield according to claim 22, wherein said guide channel is L-shaped and is adapted to extend over a top edge of said structure.

24. The weather shield according to claim 23, further comprising a support hook attached to said base panel and adapted to engage a top edge of said structure when said base panel is in said deployed position.

25. The weather shield according to claim 24, further comprising a biasing means for biasing said base panel toward said stored position.

26. The weather shield according to claim 24, wherein said mounting bracket further comprises a top cover for protecting the inside of said mounting bracket when said base panel is in said stored position.

27. A method of using a retractable weather shield for protecting the interior of an outdoor structure from the elements comprising the step of:
  (a) moving a base panel, slideably mounted within a mounting bracket, from a stored substantially vertical position, wherein said base panel is substantially within said mounting bracket and between a substrate and a structure, to a deployed position, wherein said base panel is substantially outside said mounting bracket and is adapted to extend over said structure in a substantially perpendicular direction so as to protect said structure from the elements.

28. The method of protecting the interior of an outdoor structure from the elements as claimed in claim 27, further comprising the step of;
  (b) sliding out a first telescoping panel slidably mounted and supported within said base panel.

29. The method of protecting the interior of an outdoor structure from the elements as claimed in claim 28, further comprising the step of;
  (b) sliding out a second telescoping panel slidably mounted and supported within said first telescoping panel.

30. A Building Entrance Protector comprising:
  a door;
  an interior space covered by said door when said door is closed;
  a mounting bracket adapted to mount said Building Entrance Protector to a mounting surface and mounting said Building Entrance Protector to said bracket such that said bracket lies sandwiched between said mounting surface and said Building Entrance Protector;
  a base panel slideably mounted to said mounting bracket and stored in a storage space in said mounting bracket storing said base panel in a stored position between said mounting surface and said Building Entrance Protector;
  said mounting bracket having a guide channel engaging a corresponding guide member on said base panel; said guide channel adopted for guiding said base panel between said stored position and a deployed position above said Building Entrance Protector for protecting said Building Entrance Protector from the elements when in said deployed position.

* * * * *